Patented Sept. 10, 1929.

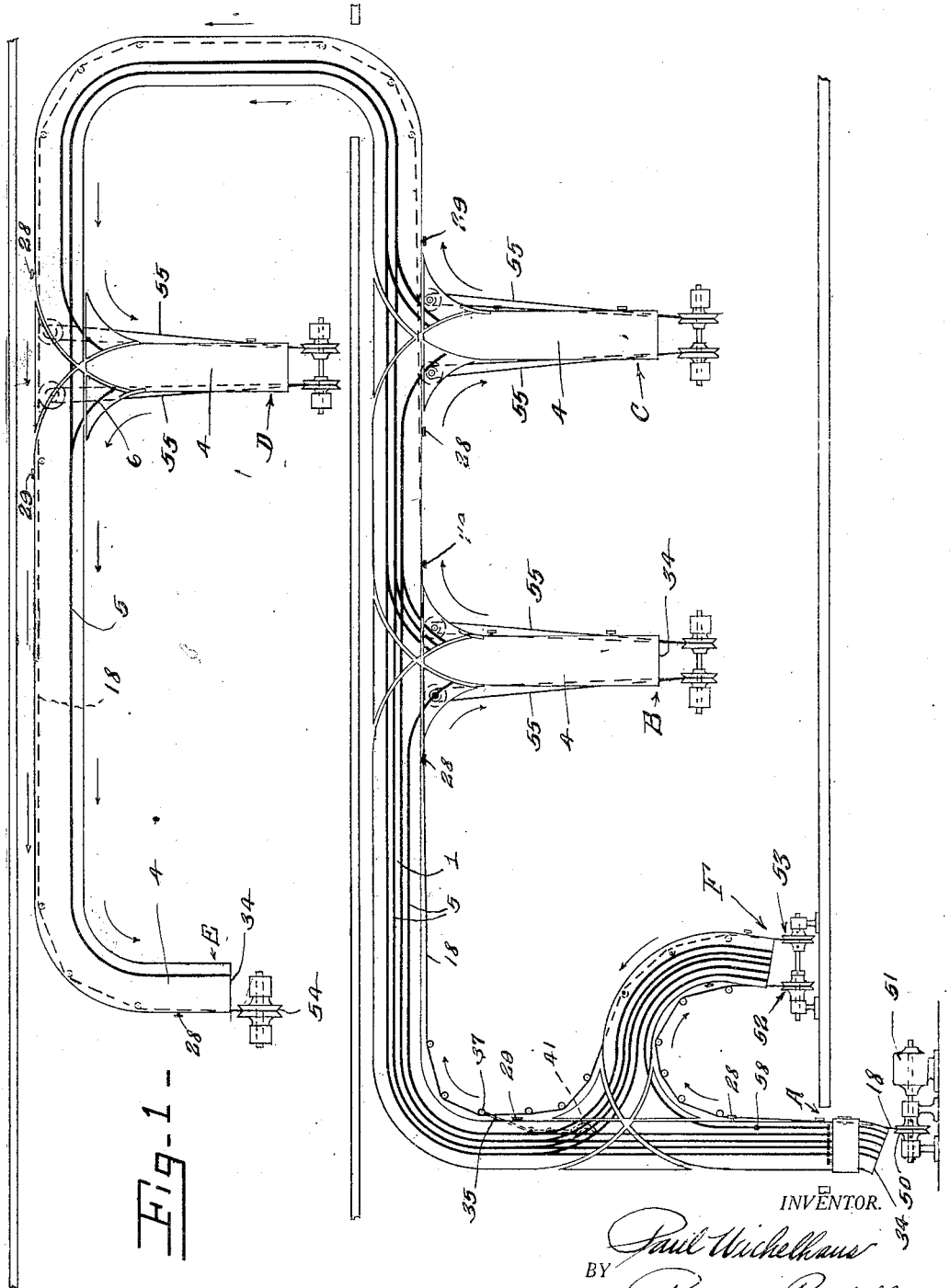

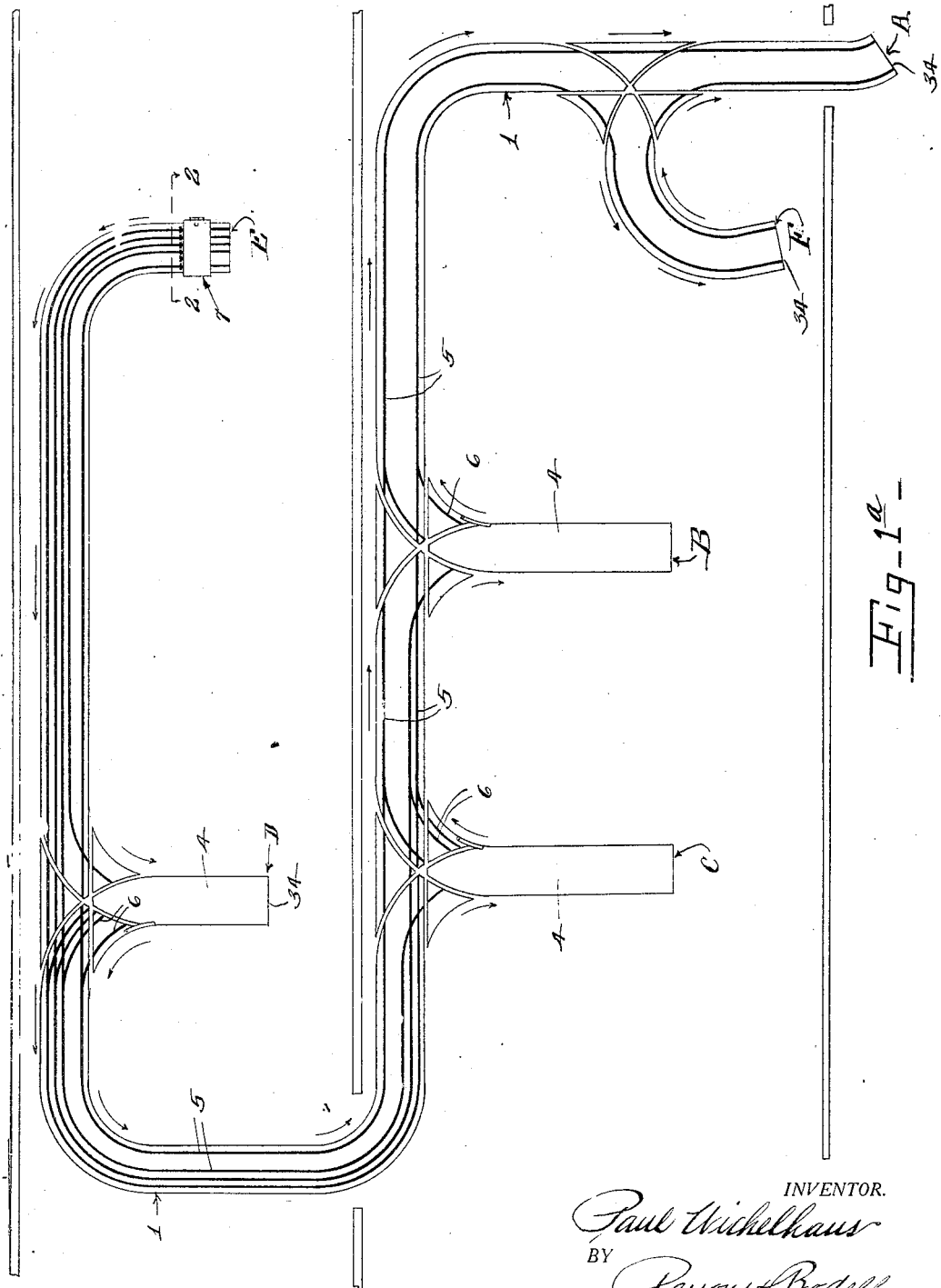

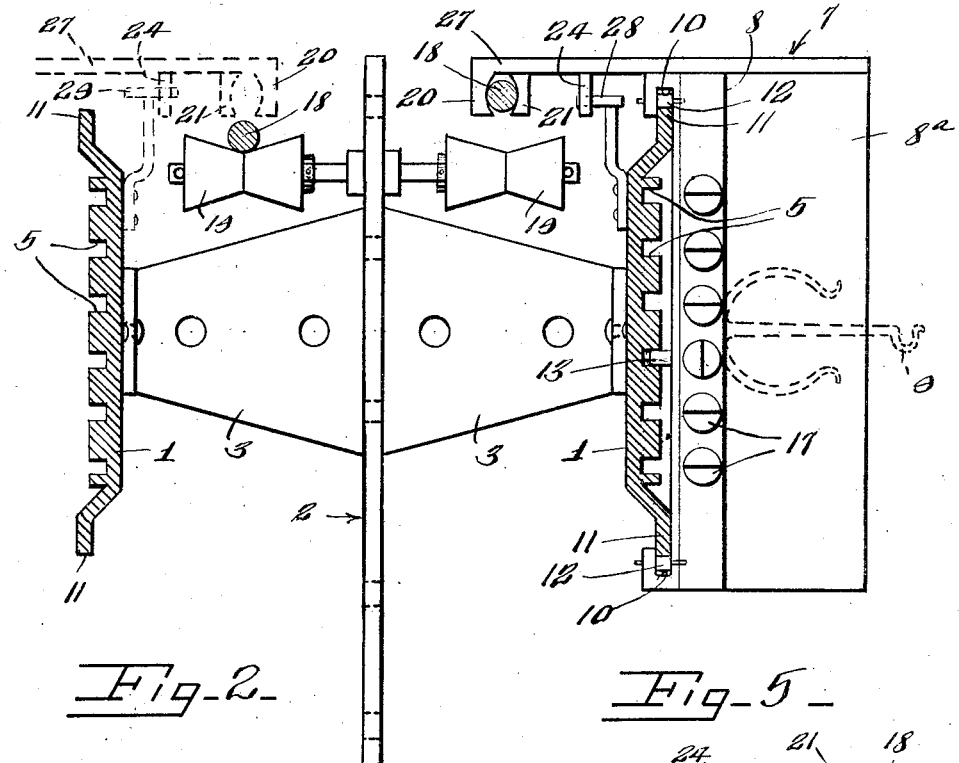
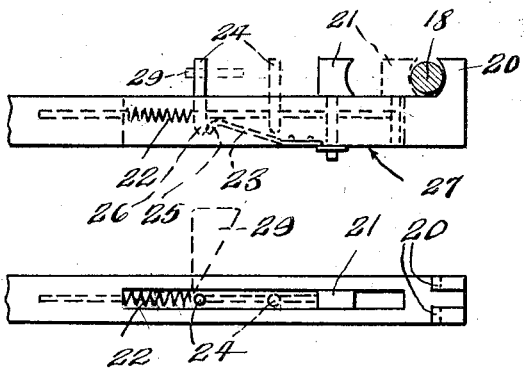
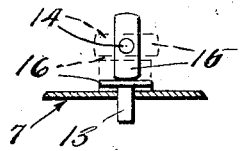
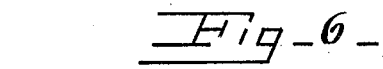
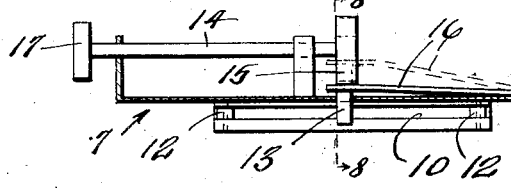

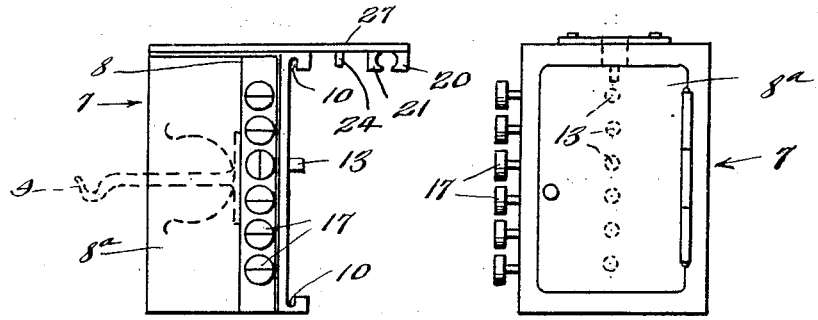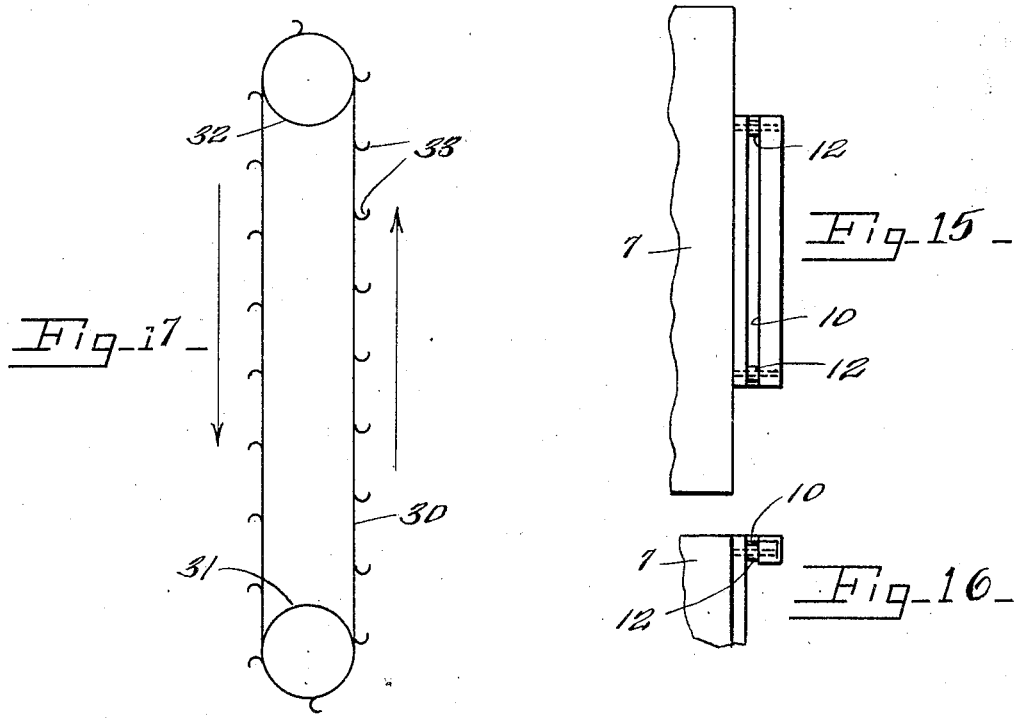

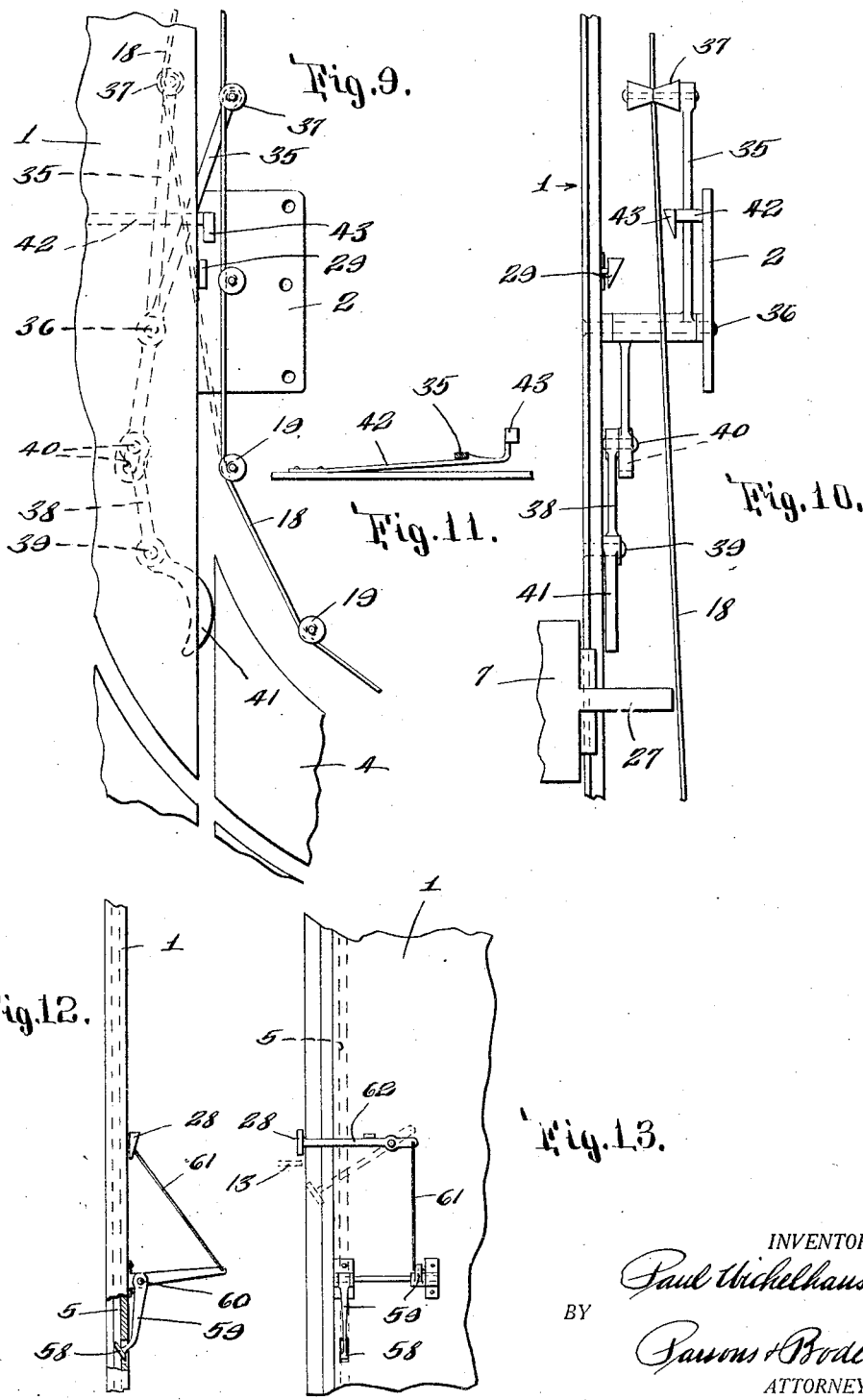

1,727,798

UNITED STATES PATENT OFFICE.

PAUL WICHELHAUS, OF SYRACUSE, NEW YORK.

CONVEYING APPARATUS.

Application filed June 11, 1924. Serial No. 719,427.

This invention relates to conveying apparatus, such as are used for conveying money, packages, notes or letters etc., from a central station to various outlying stations or from outlying stations to the central stations or from one station to another along the route. It has for its object a particularly simple selecting means for selecting the route to be taken by the carrier, and for propelling the carrier along the main track or the branch track.

The invention consists in the novel features and in the combinations and constructions hereinafter set forth and claimed.

In describing this invention, reference is had to the accompanying drawings, in which like characters designate corresponding parts in all the views.

Figure 1 is a diagrammatic plan view of the conveying apparatus.

Figure 1ª is a view similar to Fig. 1 of the opposite side of this conveying apparatus.

Figure 2 is an enlarged cross-sectional view of the track and carrier thereon taken on line 2—2, Fig. 1ª.

Figures 3 and 4 are elevations taken at a right angle to each other of one of the carriers.

Figures 5 and 6 are fragmentary elevations taken at a right angle to each other of the cable gripping mechanism associated with the carriers.

Figure 7 is an enlarged fragmentary sectional view of the carrier illustrating the selecting mechanism.

Figure 8 is a sectional view taken on line 8—8, Fig. 7.

Figure 9 is an enlarged plan view of the cable positioning mechanism indicated in Fig. 1.

Figure 10 is a side elevation of parts shown in Fig. 9.

Figure 11 is a detail view of the catch shown in Figs. 9 and 10.

Figures 12 and 13 are detail views of the means for moving the movable cable grip operating mechanism out of operative position.

Figures 15 and 16 are fragmentary views of the carrier and channels associated therewith.

Figure 17 is a diagrammatic view of the means for propelling the carrier across the station intersections.

Figure 14:
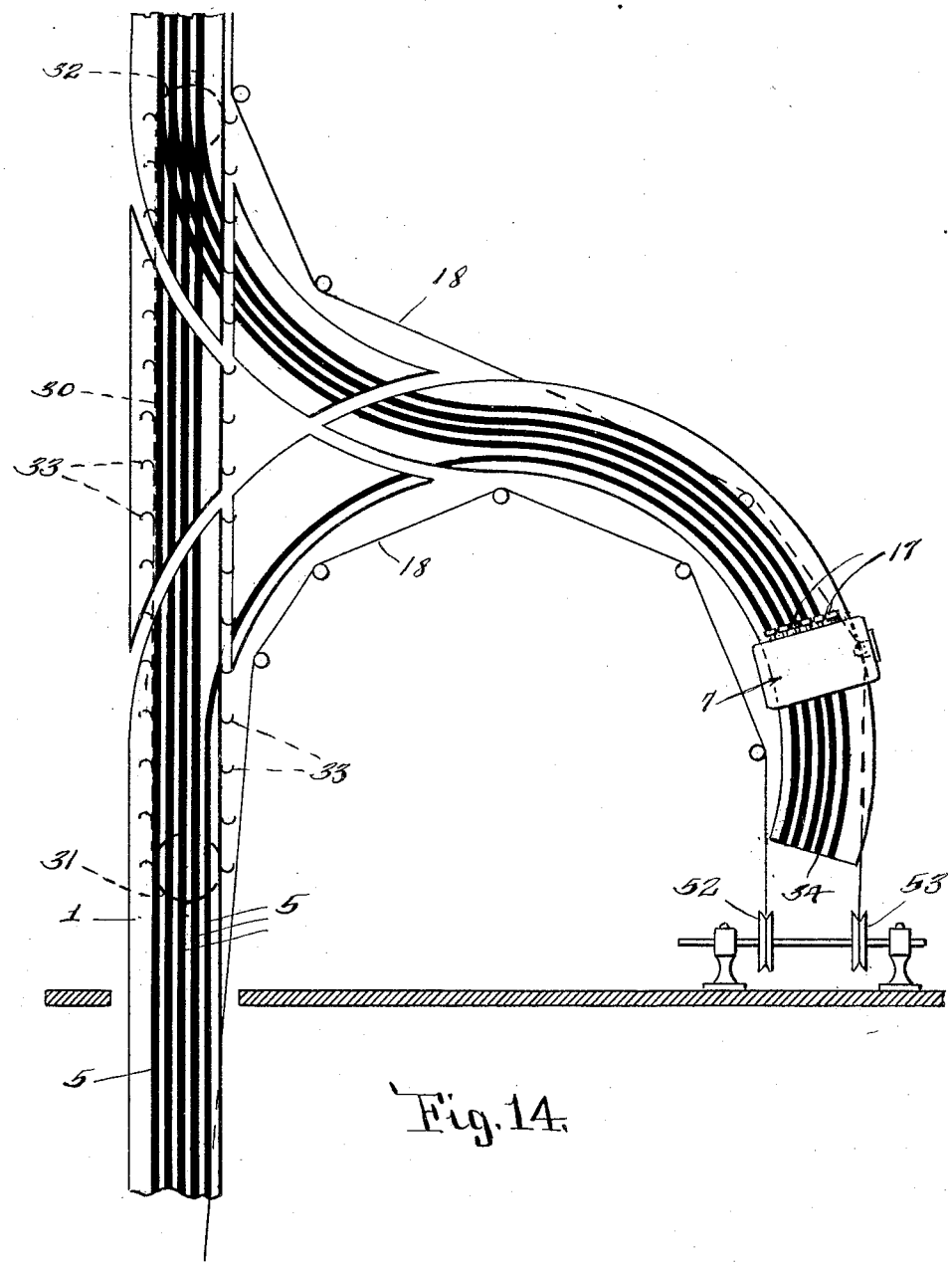
Figure 14 is an enlarged diagrammatic view of a portion of the conveying apparatus shown in Fig. 1.

This conveying apparatus comprises generally a main track, branch tracks leading therefrom, guides associated with the main track, a corresponding guide individual to each branch track and forming a continuation of one of the guides of the main track, a conveyor movable along the track and means operable to selectively engage any one of the guides.

It further comprises means for propelling the carrier along the track including a cable, a cable grip associated with the carrier and means for operating the grip to release the grip at a station and at each intersection of the branch track and the main track, when the selecting means of the carrier is set to guide the carrier along the main track past the branch track intersections, and also a device for again operating the grip to cause it to reengage the cable after the intersection is passed.

I have here illustrated the track as double, so that the carrier can move on opposite sides thereof.

1 designates the tracks suitably supported at intervals by a central frame member 2, having webs or brackets 3 at intervals secured to the tracks, the track may be arranged in a vertical position as shown in Fig. 2.

The branch track or tracks 4 are similar in construction to the main track. The main track is provided with a plurality of guides as grooves 5, extending lengthwise thereof and corresponding in number to the number of stations to which the carrier can be conveyed, and each branch track has a similar guide 6 extending to the same, and forming a continuation of one of the tracks 5.

7 is the carrier movable along the track 1, it being formed with a suitable compartment or space 8 for the reception of a box as 8ª, letters or other articles, the carrier instead of having a box may be provided with hooks 9 on which articles to be conveyed are hung. Each carrier 8 is provided with channels 10 for receiving flanges 11 at opposite edges of each track 1, the carriers have rollers 12 for running on the edges of the flanges 11.

The means on each carrier operable for selectively engaging any one of the guides 5, and the continuations thereof on each branch track, comprises a series of followers or pins 13, corresponding in number to the guides on the main track, which guides are preferably in the form of grooves for receiving the pins, and means for operating the pins 13 to project them into engagement with the guides, that is, into the grooves.

The operating means for the followers comprises shafts 14, one for each pin or follower having an eccentric or cam 15 thereon, coacting with a spring 16 carrying each pin 13. The shafts 14 are journalled in a wall of the carrier and extending to the outside thereof. The eccentric is mounted on the inner end of each shaft, and a knob or handle 17 is mounted on the other end. Each spring is a flat spring in the carrier and fixed at one end to the carrier and to the pin at its free end, the eccentric coacts with the free end of the spring. Obviously by turning any one of the shafts 14, the eccentric thereon will be turned to cause the high point to depress the spring and project the pin carried by that spring into the corresponding guide or groove 5. Upon again turning the shaft the low point of the cams will come opposite the spring permitting it to withdraw the pin. A quarter turn of the shaft for each operation is all that is required.

This means for carrying the carrier along the track comprises an endless belt or cable 18 movable along the track and supported on rollers 19 carried at suitable intervals along the frame 2. Each carrier is provided with means as a jaw for engaging the upper or lower run of the cable, that is, the opposite runs of the cable. The cable grip means comprising a fixed jaw 20 and a movable jaw 21, which is pressed by a spring 22, toward the jaw 20 to grip the cable 18, this spring-pressed jaw being held in its out position by a spring-pressed or ratchet device 23, Fig. 5. The spring-pressed jaw also has associated therewith a pin or shoulder 24 to be presently described. The latch device is here shown as a flat spring fixed at one end and having a notch 25 at its free end for engaging a shoulder 26 on the movable jaw, the jaws and latch are carried by an arm 27 overhanging or underlying the cable.

The cables 18 are constantly running and one run of the cable actuates the carrier in one direction and the other run in the opposite direction, and each carrier as a cable grip for engaging one of said runs of the cable.

At each station means is provided for releasing the cable grip or jaw 21 from the cable, this means comprises a knock-off device 28 arranged in the path of the pin 24 to move the pin against the action of the spring 22, into engagement with the latch 23. And hence, shifts the jaw 21 to release the cable.

Also at each intersection there is a similar knock-off device 28 arranged in the path of the pin 24 to move the pin against the action of the spring 22, so that, the grip is released from the cable when the carrier is set to travel along the main track past the intersection. Also a knock-on device 29 is arranged along the track in the path of the pin 24 to release the pin after the carriage has passed the intersection and the cable grip is in position to again grip the cable. The knock-off device and knock-on device 28 and 29 are merely oppositely arranged wedges or cams arranged to engage and shift the pin and hence the jaw 21 in opposite directions.

The means for propelling or impelling the carrier across the intersection when the grip is released from the main cable 18 comprises an endless belt or cable 30 running over suitable pulleys 31 and 32 and having shoulders 33 at intervals arranged to strike or push against the overhanging arm 27 and thus impel the carrier across the intersection. Ordinarily when the track is level no impelling means is necessary as the carriage will travel by its own momentum across the intersection, but in case the track at the intersection is at an incline impelling means is required.

The shoulders 33 merely thrust or push against the overhanging arm 27 and thus readily disengage from said arm when the belt changes its direction of movement as when passing around the pulleys.

In Fig. 2, the cable grip is shown as gripped to the cable at a point between two of the guide rollers. Each carriage at its station can be taken off the end of the track, as for instance at the end 34, thus moving the rollers 12 carried by the carriage out of engagement with the flanges 11 of the track. At any station the carrier 7 is placed on the track with the overhanging arm 27 in position to cause the cable grip to grip either the upper or lower run of the cable in accordance with the direction which the carrier is to travel.

The knob or handle 17 of one of the follower pins 16 is turned to project the pin into its guide, and the cable grip released or tripped to grip the cable. Whereupon the carrier travels from the branch track to the main track and along the main track to its destination. When it passes an intersection the knock-off device 28 releases the cable grip until the carrier has passed the intersection, then the knock-on device again trips the cable grip. When the carrier approaches the intersection of the track leading to the station to which it is designed to go the pin guides the carrier onto the branch track.

In order to position the belt so as to engage the cable grip after the cable grip has released the cable when crossing an intersection, means is provided for shifting the cable into alinement with the cable grip. This means is operable by the carriage and comprises a lever arm 35, Fig. 9, pivoted to the support 2 by the track at 36 and carrying at one end a roller 37 engaging the cable and being connected at its other end to the shifting lever 38 pivoted at 39 and having one arm connected to the lever 35 by a pin and slot connection 40 and having its other arm 41 arranged in the path of the arm 27 of the carriage, this cable shifting means being located at the exit end of the intersection.

In operation when the carriage is being carried across the intersection by the belt or cable 30 or by momentum, and as it approaches the point where it is nearly across the intersection, the arm 24 engages the arm 41 of the lever 38 and shifts such lever 38 and hence moves the belt shifting lever 35 to carry the belt into the dotted line position shown in Fig. 9. The lever 35 is held in its shifted position by a spring latch 42, Fig. 11 which engages the lever 35 and holds it in its shifted position, this latch having a trip or cam 43 arranged in the path of the overhanging arm 27, which carries the fixed jaw 20 of the cable grip, and when tripped permits the cable 18 to return to its normal position. However, before the latch 42 is so tripped the knock-on device 29 has engaged the pin 24 to release the movable cable grip jaw 21 to again grip the cable.

In Figs. 1 and 1ª I have illustrated a system including five stations A, B, C, D and E, and also another branch F, which may have stations leading therefrom. As shown, the cable 18 passes over the pulley 50 driven by the motor 51 and around the rollers of the branch F, around the pulley 52 and back to the pulley 50 and an additional cable 18 is driven in the reverse direction from a pulley 53 along the branch F to the various stations B, C, D and E, and at the last station E passes around the pulley 54.

Each station B, C, D and E is provided with individual belt lines 55 for carrying the carrier from the station to the main line cable.

In operation, assuming that a carriage is to be sent from station A to one of the stations B, C, D and E, the proper pin 13 is operated by turning its companion handle or knob 17, so that, the pin engages its companion groove or guide 5 and the cable grip released to engage the cable thereupon, the carriage travels from the station A to the intersection of the branch F where the cable grip is released from the cable by the knock-off device 28, and the carriage moved across the intersection, either by its momentum or by the belt 30. As the carriage approaches the far side of the intersection, it engages the belt shifting means 38, shown in Fig. 9, and also the knock-on device for causing the cable grip to re-grip the cable, and the carriage is then carried along the main track to its station as the station B. If it is going to any additional station beyond station B, it passes the intersections the same as before. To cause a carriage to travel from any of the stations B, C, D and E to any other station, as for instance, from station B to station E, the proper follower pin is operated to engage the companion groove on the track and the cable grip of the carriage engages with the cable 56, which carries the carriage to the main cable 18 past the cable grip releasing the knock-off and knock-on means. To return the carriage from a station, the carriage is arranged to engage the guides on the opposite sides of the track from those engaged when the carriage travels to the station, in other words, one track and one run of the cable is used to carry the carriage in one direction and the other track and other run of the cable to move the carriers in the opposite direction.

To direct a car on to the branch F, say from station A, the proper follower pin is operated and means is provided for preventing the releasing of the cable grip from the cable 18 as the main cable passes around the branch F and hence there is no necessity for releasing the cable. In the tracks, or grooves leading to the branch F, means is provided for shifting the knock-off device out of operative position. This means is shown in Figs. 12 and 13, and consists of a cam 58 arranged in the grooves 5 leading to the branch F, this cam being arranged in a position to be engaged by the follower pin and being carried by one arm of the bell crank lever 59 pivoted at 60 and having its other arm connected by the link 61 to the lever 62 carrying the knock-off device or wedge 28. When the pin or follower engages the cam 58, it shifts the knock-off device 28 out of the path of the pin 13 on the carriage. Carriages can be sent from the branch F back to station A or to any station B, C, D and E or from any station B, C, D and E to the station F by merely selecting the proper follower pin 13 and arranging the carrier on the proper side of the track, so that, its cable grip will engage the cable running in the right direction.

The main cable passes along the main track and to various branch tracks, and to have the car move in one direction the cable grip is engaged with the upper run of the cable and in the other direction with the lower run of the cable.

By reason of the selectively engaged guides a carrier can be set to run between any two stations, and the system provided with as many stations as there are guides.

In the illustrated embodiment of my invention the system has six stations, and as the tracks are double and there are six guides on each main track, and hence six branch tracks or stations from each main track.

What I claim is:—

1. In a conveying apparatus, the combination of a main track, a branch track leading from the main track, a plurality of guides extending lengthwise of the main track from a central station and a fixed guide extending along the branch track and forming a rigid continuation of one of the guides of the main track, a conveyor movable along the track and having means for selectively engaging the guides of the main track and means for actuating the carrier along the track.

2. In a conveying apparatus, the combination of a main track, and a branch track, leading from the main track, guides associated with the main track, and a guide extending along the branch track and forming a continuation of one of the guides of the main track, a conveyor movable along the track, followers associated with the carrier, and paired respectively with the guides of the main track, the followers being normally out of engagement with the guides, and means for shifting any one of the followers into engagement with its companion guide.

3. In a conveying apparatus, the combination of a main track and a branch track, leading from the main track, guides associated with the main track, and a guide extending along the branch track and forming a continuation of one of the guides of the main track, a conveyor movable along the track, followers associated with the carrier, and paired respectively with the guides of the main track, the followers being normally out of engagement with the guides, and means for shifting any one of the followers into engagement with its companion guide, the guide comprising a groove extending lengthwise of the track, and the followers comprising pins movable respectively into the groove.

4. In a conveying apparatus, the combination of a main track, a branch track leading from the main track, a carrier movable along the tracks, and selectively operated means for guiding the carrier continuously along the main track or on to the branch track, a cable movable along the tracks, the carrier having a cable grip, means for causing the grip to engage the cable, means for releasing the grip from the cable when the selecting means is set to guide the carrier along the main track past the branch track intersection, and means for operating the grip to re-engage the cable after the carrier is past the intersection, and means for propelling the carrier across the track intersection when the cable grip is released from the cable.

5. In a conveying apparatus, the combination of a main track, a branch track leading from the main track, guides extending along the main track, a guide extending along the branch track, and forming a continuation of one of the guides of the main track, means on the carrier for selectively engaging the guides of the main track, a cable running along the track, a cable grip associated with the carrier including a movable spring-pressed jaw for engaging the cable, a knock-off device for operating the jaw to release the cable when the selecting means is set to guide the carrier along the main track past the branch track intersection, and a knock-on device arranged to operate the jaw to re-engage the cable after the carrier has passed such intersection, and means for propelling the carrier across the intersection when the cable grip is released from the cable.

6. In a conveying apparatus, the combination of a main track, a branch track leading from the main track, a carrier movable along the tracks, and selectively operated means for guiding the carrier continuously along the main track or on to the branch track, a cable movable along the tracks, the carrier having a cable grip, means for causing the grip to engage the cable, means for releasing the grip from the cable when the selecting means is set to guide the carrier along the main track past the branch track intersection, and means for operating the grip to re-engage the cable after the carrier is past the intersection, and means for propelling the carrier across the track intersection when the cable grip is released from the cable, the propelling means comprises a cable movable along the track and having shoulders at intervals arranged to pick up the carrier.

7. In a conveying apparatus, the combination of a main track, a branch track leading from the main track, guides extending along the main track, a guide extending along the branch track, and forming a continuation of one of the guides of the main track, means on the carrier for selectively engaging the guides of the main track, a cable running along the track, a cable grip associated with the carrier including a movable spring-pressed jaw for engaging the cable, a knock-off device for operating the jaw to release the cable when the selecting means is set to guide the carrier along the main track past the branch track intersection, and a knock-off device arranged to operate the jaw to re-engage the cable after the carrier has passed such intersection, and means for propelling the carrier across the intersection when the cable grip is released from the cable, the propelling means comprises a belt having shoulders arranged to pick up and thrust against the carrier.

In testimony whereof, I have hereunto signed my name, at Syracuse, in the county of Onondaga, in the State of New York, this 4th day of June, 1924.

PAUL WICHELHAUS.